United States Patent [19] [11] 4,277,028
Olson [45] Jul. 7, 1981

[54] IRRIGATION SYSTEM AND DRIVE UNIT THEREFOR
[75] Inventor: Dale E. Olson, Fremont, Nebr.
[73] Assignee: Valmont Industries, Inc., Valley, Nebr.
[21] Appl. No.: 752,318
[22] Filed: Dec. 20, 1976
[51] Int. Cl.³ .............................................. B05B 3/18
[52] U.S. Cl. .................................... 239/184; 239/711; 239/716
[58] Field of Search ............... 137/344; 239/184, 186, 239/190, 212, 213, 177, 711, 716

[56] References Cited
U.S. PATENT DOCUMENTS

| 3,001,721 | 9/1961 | Zybach | 239/177 |
| 3,583,428 | 6/1971 | Cornelius | 137/344 |
| 3,744,514 | 7/1973 | Stafford | 137/344 |
| 3,750,696 | 8/1973 | Cornelius | 137/344 |
| 3,848,625 | 11/1974 | Courtright | 137/344 |
| 3,980,098 | 9/1976 | Courtright | 137/344 |
| 4,006,860 | 2/1977 | Cornelius et al. | 239/212 |
| 4,142,547 | 3/1979 | Courtright | 239/716 |

Primary Examiner—Gerald A. Michalsky
Attorney, Agent, or Firm—Rogers, Eilers & Howell

[57] ABSTRACT

An irrigation system for irrigating an area of a field and which includes a liquid conduit extending over a portion of said area to be irrigated. The conduit is supported by wheels which rotate with rotation of the conduit. The system includes a drive unit which is supported for movement on the ground along a path by wheels which are rotatably mounted thereto. The conduit is rotatably mounted to the drive unit for rotation about a generally horizontal axis generally normal to the defined path of the drive unit. The drive unit supplies liquid to the conduit and includes means for rotatably driving the conduit and for driving the drive unit along the path, and further includes a control system for selectively varying the relative speed of the drive unit and conduit in response to fore and aft displacement of the drive unit relative to the conduit.

5 Claims, 14 Drawing Figures

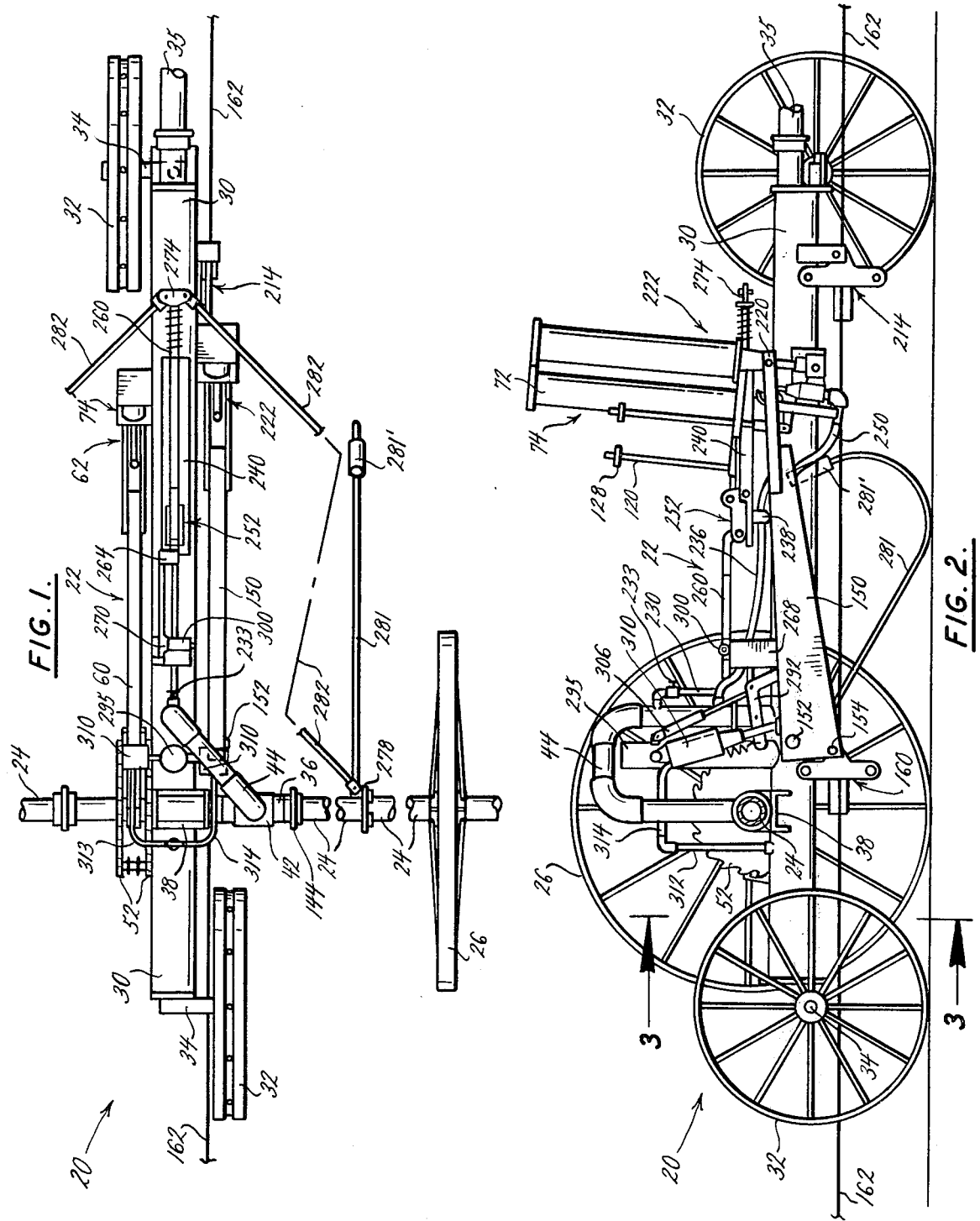

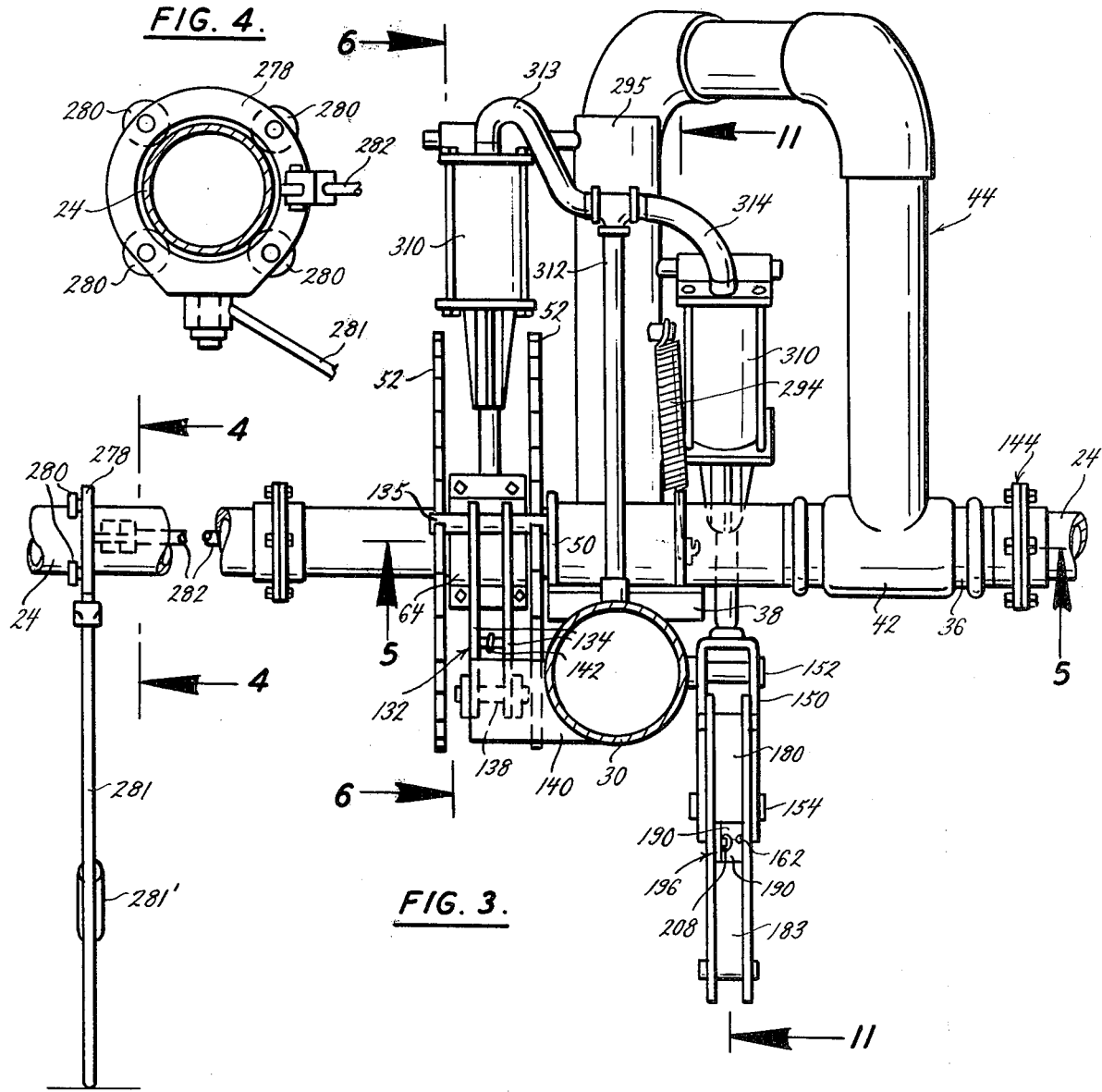
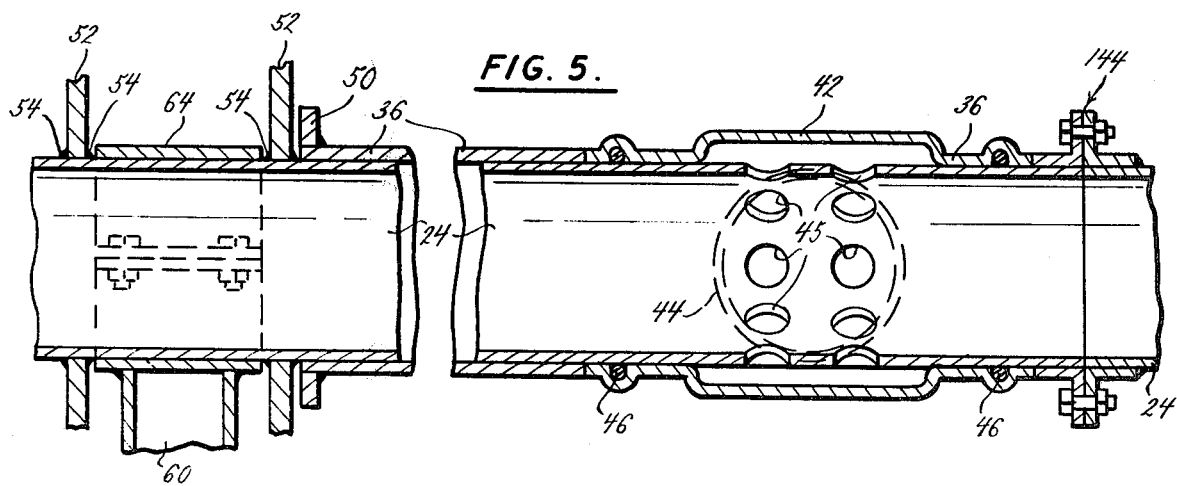

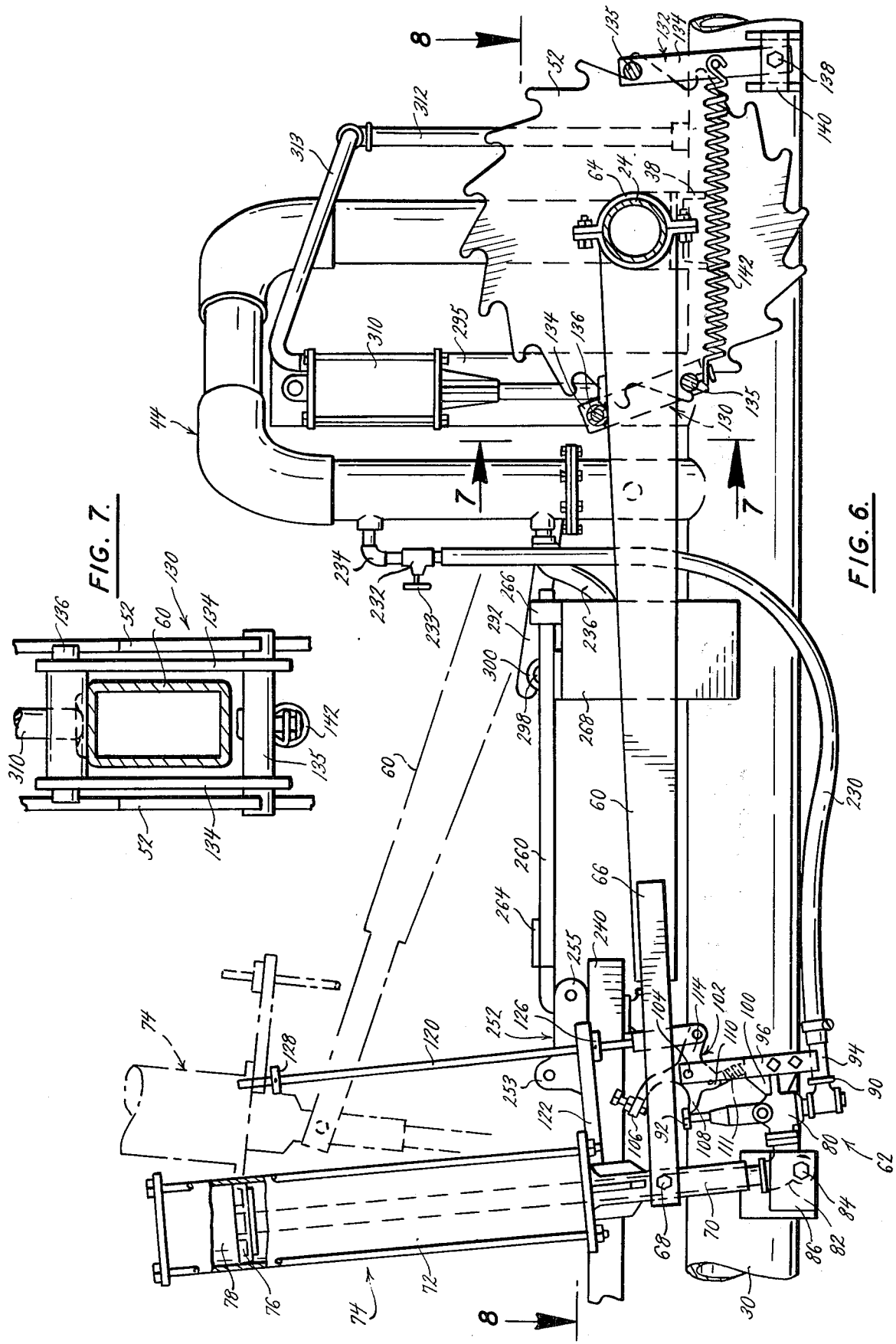

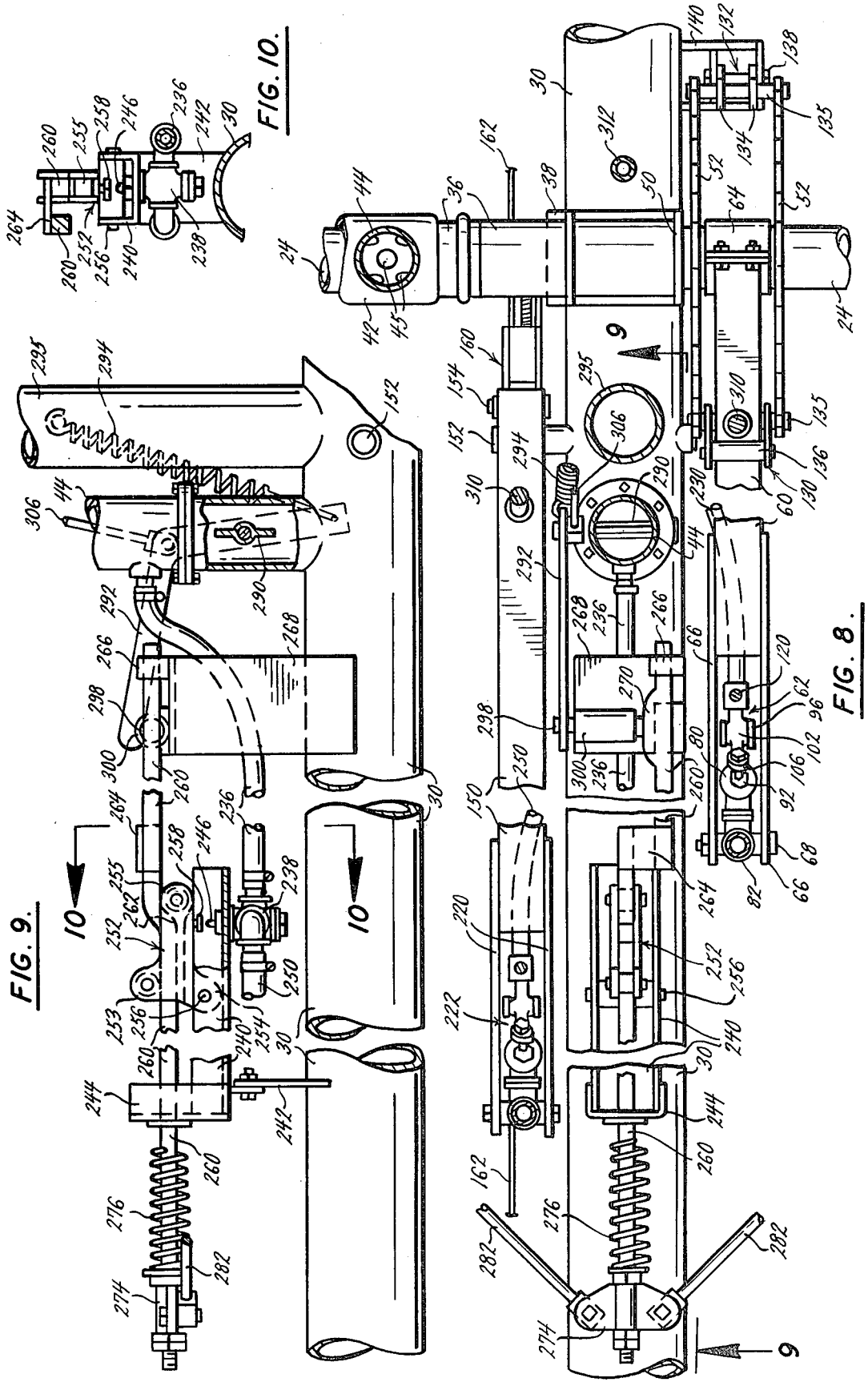

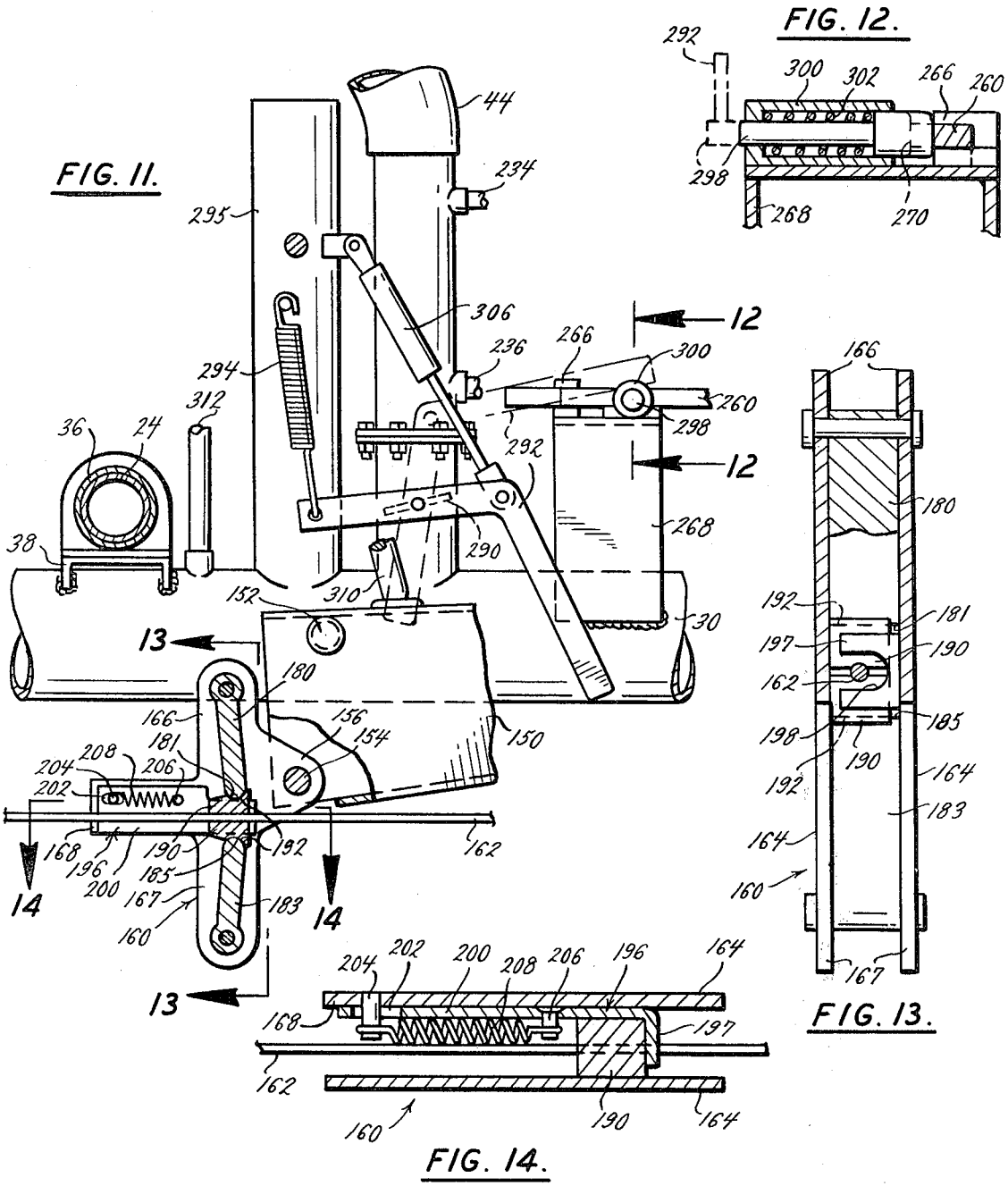

IRRIGATION SYSTEM AND DRIVE UNIT THEREFOR

BACKGROUND AND SUMMARY OF THE INVENTION

This invention generally relates to an irrigation system and a drive unit for use therewith, and more specifically relates to a continuous move side roll irrigation system and a drive unit therefor. Such systems are of a type including a conduit which extends across the area to be irrigated. Such a conduit can be several hundred feet long. The conduit is supported above the ground by a series of spaced concentric wheels which are secured to the conduit for rotation therewith, and a series of sprinklers are spaced along the conduit for delivering liquid fed through the conduit to the area to be irrigated. The conduit is made to travel more or less continuously in a linear movement over the field by imparting rotation to the conduit and thereby imparting rotation to the wheels supported thereon.

Such side rolls systems are known in the art and are used with a drive unit which functions both to rotatably drive the conduit and supply liquid to the conduit as it is caused to move over the area to be irrigated. Such drive units are also generally known in the art. An example is shown in U.S. Pat. No. 3,848,625.

However, certain problems have been associated with these side roll and drive unit systems due to the difficulty of maintaining proper alignment of the drive unit relative to the conduit and of maintaining a selected speed. It is customary in these systems for the liquid to be supplied to the conduit by means of a hose which is dragged along by the drive unit, the other end of the hose being connected to a suitable supply of liquid. Since the amount of liquid which must be supplied to the conduit is relatively large, the conduit being as much as 4 to 7 inches in diameter, the size and weight of the hose that must be pulled along by the drive unit are substantial, and thus the drive unit must also include some means for driving the drive unit as well as rotatably driving the conduit. Heretofore it has been customary to drive the drive unit along the path and rotatably drive the conduit at predetermined fixed speeds. However, this approach has not been totally satisfactory for the following reasons:

As the drive unit and conduit move over the field, the topography of the land over which the conduit moves may be and usually is different from that over which the drive unit moves. Thus, the distance that the drive unit moves from one end of the field to the other is likely to be different from the distances traveled by the conduit wheels due to hills and depressions over which the wheels must roll. If the relative speed between the drive unit and conduit is fixed, there is no compensation for these differences in the distances travelled with the result that the drive unit will move ahead or behind the conduit causing misalignment. If this misalignment becomes excessive, the conduit can rupture resulting in costly shutdown and repair.

Another problem that occurs is that as the drive unit and conduit move down the field, the amount and therefore weight of hose that is dragged by the drive unit, together with the weight of the water in the hose, continually increases. This places a continually increasing load on the drive unit. As the load increases, the speed of the drive unit decreases and if the relative speed of the drive unit and conduit is fixed, the speed of the conduit also decreases. Not only does this slow down the irrigation process, but it also produces an uneven amount of irrigation over the field.

The system and control unit of this invention overcome these problems by automatically regulating the relative speed of the drive unit and the conduit in response to fore and aft displacement of the drive unit relative to the conduit. In a preferred embodiment of the invention, the speed of the drive unit is varied to maintain alignment with the conduit so that there is no rupturing of the conduit due to misalignment and no slowdown of the drive unit and conduit due to an increasing load placed on the drive unit by the hose.

Generally, the drive unit in the system of this invention includes a frame with wheels rotatably mounted to the frame for supporting the frame above the ground and for moving it along a path. The conduit of the irrigation system is rotatably mounted to the frame and there is included in the drive unit a means for rotatably driving the conduit thereby imparting rotation to the wheels upon which the conduit is supported. The drive unit also includes means for supplying liquid to the conduit for continuously applying the liquid to the field over which the conduit moves.

A cable gripping device is provided as part of the drive unit and engages a fixed cable stretched along the path for the drive unit. Means are provided for operating the cable gripping device thereby moving the drive unit along the fixed cable.

A linkage arrangement is connected between the conduit and the drive unit, portions of which extend from the conduit at angles toward the drive unit. The linkage is part of a control system for controlling the speed of operation of the cable gripping device relative to the speed of rotation of the conduit in response to movement of the linkage corresponding to fore and aft displacement of the drive unit relative to the conduit.

In a preferred embodiment of the invention, the drive means for the cable gripping device and conduit are liquid powered with the speed of these drives being proportional to the amount of liquid supplied to the liquid power sources. The control means includes means for varying the amount of liquid supplied to the liquid power source in response to fore and aft displacement of the drive unit relative to the conduit.

Means are also provided for shutting off the water to the system, thus deactivating both drive means at predetermined displacements of the drive unit relative to the conduit.

Thus, it is a primary object of this invention to provide an irrigation system and drive unit therefor wherein the relative speed of the drive unit and the conduit is automatically controlled, and further where this control is in response to relative displacement of the drive unit and conduit. These and other objects of the invention are apparent from the drawing and detailed description to follow.

DESCRIPTION OF THE DRAWINGS

FIG. 1 is a top plan view of an irrigation system and drive unit of this invention;

FIG. 2 is a side elevation view of the drive unit of this invention;

FIG. 3 is an enlarged view in section taken generally along the line 3—3 of FIG. 2;

FIG. 4 is an enlarged view in section taken generally along the line 4—4 of FIG. 3;

FIG. 5 is an enlarged view in section taken generally along the line 5—5 of FIG. 3;

FIG. 6 is a view in section taken generally along the line 6—6 of FIG. 3;

FIG. 7 is a view in section taken generally along the line 7—7 of FIG. 6;

FIG. 8 is a view in section taken generally along the line 8—8 of FIG. 6;

FIG. 9 is a view in section taken generally along the line 9—9 of FIG. 8;

FIG. 10 is a view in section taken generally along the line 10—10 of FIG. 9;

FIG. 11 is a view in section taken generally along the line 11—11 of FIG. 3;

FIG. 12 is a view in section taken generally along the line 12—12 of FIG. 11;

FIG. 13 is a view in section taken generally along the line 13—13 of FIG. 11; and FIG. 14 is an enlarged view in section taken generally along the line 14—14 of FIG. 11.

DETAILED DESCRIPTION OF THE PREFERRED EMBODIMENT

Referring to the drawing and particularly FIGS. 1 and 2, there is shown an irrigation system 20 of this invention generally including a drive unit 22 for driving, and feeding liquid to, a distribution conduit 24. The system 20 is of the type for irrigating farmland and particularly of a type known as the continuous move side roll system. Thus, the conduit 24 may be several hundred feet long and extends over the field to be irrigated with a series of concentric wheels 26 spaced along its length, the wheels 26 being secured to the conduit 24 for rotation therewith. In this embodiment of the invention the conduit 24 extends to each side of the drive unit. The system of the type to which this invention is particularly directed is to one where the wheels 26 are made to move in a substantially straight line down the field so that the conduit 24 covers a generally rectangular pattern. In a preferred embodiment the conduit 24 and wheels 26 are made to roll down the field by rotatably driving the conduit 24. It is to be understood that a series of sprinklers (not shown) are spaced along the conduit 24 for continuously distributing the liquid fed through the conduit onto the field as the conduit moves more or less continuously thereover.

One of the problems with the continuous side roll system, as opposed to what is commonly known as a "center-pivot system", is the difficulty with supplying water to the system. In a center pivot system a fixed source of water, such as a well, is located at the fixed pivot point of the conduit where it is pumped directly for distribution over the field. With a continuous end roll system no such fixed point exists since the entire conduit is moved linearly down the field, and therefore some other means must be provided for supplying water to the system. One such means is the use of a drive unit which pulls a flexible hose of substantial size and weight, the hose being connected at the other end to a suitable water or other liquid source. The drive unit 22 performs the additional function of rotatably driving the conduit 24, which in this described embodiment is from a position intermediate the ends of the conduit 24, and includes a control system for regulating the speed of the drive unit 22 relative to the conduit 24 to maintain alignment of the drive unit and conduit as will be more fully explained.

More specifically, the drive unit 22 of this invention has a generally horizontal tubular frame 30 extending generally parallel to the path of movement of the drive unit. Wheels 32 are rotatably mounted by axles 34 at the forward and rearward ends of the tubular frame 30 and on opposite sides thereof for supporting the frame above the ground and for moving it along a generally straight path. A hose 35 connects the frame 30 at its rearward end to a suitable source of water or other liquid.

The conduit 24 at the location of the drive unit is mounted for rotation within a sleeve 36 secured to the top of the tubular frame 30 by means of a suitable bracket 38. The sleeve 36 has a portion 42 of enlarged diameter. A conduit section 44 interconnects the tubular frame 30 at a location rearward of the sleeve to the enlarged portion 42 of the sleeve so that liquid fed into the tubular frame 30 is fed through the conduit section 44 and into the sleeve 36. The portion of the conduit 24 within the enlarged portion 42 of the sleeve 36 has holes 45 so that liquid entering the enlarged portion 42 passes through the holes 45 and into the conduit 24 for distribution to the sprinklers. The sleeve 36 has annular grooves on each side of the enlarged portion 42 which receive seals 46.

One end of the sleeve 36 has an annular flange 50, and adjacent the flange a pair of sprockets 52 are concentrically mounted on the conduit 24 and firmly secured thereto such as by welds 54 for rotation therewith. The sprockets 52 are rotatably driven to rotate and thereby drive the conduit 24 and wheels 26. This is accomplished by means of an arm 60 and a liquid or water drive assembly 62.

The arm 60 is pivotally mounted at its forward end to the conduit 24 by a coupling 64 located between the sprockets 52. The arm 60 has parallel members 66 (FIG. 8) extending rearwardly from the main portion of the arm which have their rearward ends pivotally mounted at 68 to a base member 70 secured to the bottom of the cylinder 72 of a hydraulic piston and cylinder assembly 74. The cylinder and piston assembly 74 has a piston 76 which is hollowed to allow the passage of liquid therethrough and into a chamber 78. The bottom of the piston 76 extends through the base member 70 and is connected to the outlet port of a water valve 80 by an elbow coupling 82. The elbow 82 is secured by means of a rod 84 to a mounting plate 86 which in turn is secured to the frame 30. The valve 80 has a liquid inlet port 90 and an actuator 92 such as when the actuator 92 is in its raised position as shown in FIG. 6, the valve 80 is open allowing liquid to pass from its inlet 90 through its outlet and the piston 76 and into the chamber 78. When the actuator 92 is depressed, the valve is closed thereby prohibiting the passage of liquid to the outlet.

A hose fitting 94 is secured at the inlet 90. A support bracket 96 is connected to the valve 80 by means of a suitable support 100.

A generally C-shaped trip mechanism 102 is pivotally mounted at 104 at the top of the bracket 96 and has arms 106 and 108 for alternate engagement with the actuating member 92 of the valve 80. The trip mechanism 102 has a lobe 110 to which is mounted a spring 111. The other end of the spring is secured to the support 100. The spring 111 acts as a trip spring during pivotal operation of the trip mechanism 102. The trip mechanism also has a crank arm 114. A generally vertical rod 120 is pivotally mounted at its lower end to the crank arm 114 and extends through a suitable aperture at the end of a generally horizontal arm 122 secured at one end to the cylinder 72 for vertical movement therewith. Adjustable stops 126 and 128 are fastened in spaced relation on the rod 120 for engagement with the arm 122 during reciprocating vertical movement of the cylinder 72 as will be described.

In operation of the water drive assembly 62, with the actuating member 92 held in its upward position by engagement with the arm 108 of the trip assembly 102, water fed to the inlet 90 of the valve 80 is allowed to pass through the piston 76 and into the chamber 78 causing the cylinder 72 and arm 60 to move upwardly with the arm 60 pivoting about the conduit 24. When the horizontal arm 122 hits the stop 128, the rod 120 is caused to move upwardly and pivot the trip mechanism 102 such that the arm 106 engages and depresses the actuating member 92 to close the valve 80 and thereby prohibit the passage of water from the inlet 90 through the piston 76. Another port in the valve 80 is caused to open allowing the liquid to expel from the chamber 78 and allowing the cylinder 72 and arm 60 to lower until the arm 122 engages the stop 126. This causes the trip mechanism 102 to pivot and again raise the actuating member 92. In this way the arm 60 is caused to reciprocate up and down in a pivotal manner about the conduit 24. Water drive assemblies of the type just described are generally known in the art for use with water drive irrigation systems.

A pair of pawls or dogs 130 and 132 are used to translate the reciprocal pivotal movement of the arm 60 into a rotational drive for the sprockets 52. These are best shown in FIGS. 3, 6, 7 and 8. Each of the dogs has parallel members 134 with an engaging pin 135 extending therebetween at one end. The dog 130 is the driving dog and is pivotally mounted at its upper end 136 to the top of the arm 60 with its pin 135 engaging the sprockets 52. The dog 132 is the holding dog and is pivotally mounted at 138 to the tubular frame 30 by means of a suitable bracket 140. The dog 132 extends upwardly from its pivot 138 with its pin 135 acting to hold the sprockets 52 against reverse rotation, which would be counterclockwise rotation as viewed in FIG. 6. A spring 142 is located between the sprockets 52 and extends between the lower end of the dog 130 and an intermediate portion of the dog 132 to bias the dogs into engagement with the sprockets. Thus, the dog 130 acts to drive the sprockets 52 in a clockwise direction as viewed in FIG. 6 upon clockwise pivotal movement of the arm 60, and the dog 132 prevents counterclockwise rotation of the sprockets upon counterclockwise pivotal movement of the arm 60.

Referring to FIG. 5, flange coupling 144 is secured to the conduit 24 adjacent the end of the sleeve 36 opposite the flange 50, so that the flange 144 at one end of the sleeve and the inboard one of the sprockets 52 at the other end of the sleeve act to prevent axial movement of the conduit 24 relative to the sleeve and drive unit.

In addition to driving the conduit 24, the drive unit of this invention includes means for driving itself along a generally straight path. Thus, with reference to FIGS. 1, 2, 3, 8, 11, 13 and 14 there is included another arm 150 located on the side of the frame 30 opposite the arm 60. The forward end of the arm 150 has a vertical dimension sufficiently great to provide a lever action for movement of the drive unit. Thus, the forward end of the arm 150 is pivotally mounted at its upper side at 152 to the frame 30 and at its lower side at 154 to a lobe 156 of a gripper 160. A guide cable 162 is engaged by the gripper 160 and is stretched along the path for the drive unit. The cable 162 is suitably anchored at opposite ends of the field to be irrigated and remains fixed during operation. The gripper 160 is designed to grip the cable when urged to the right as viewed in FIG. 11 and to release when urged to the left. Thus the gripper 160 includes parallel plates 164, each shaped as shown in FIG. 11 with a lobe 156, an upwardly extending portion 166, a downwardly extending portion 167 and a forwardly extending portion 168. An arm 180 is pivotally mounted between the plates 164 at the top of the upwardly extending portion 166 and has a rounded lower end 181. Similarly, another arm 183 is pivotally mounted between the plates 164 at the lower end of the portion 167 and has an upper rounded end 185. Blocks 190 are located above and below the cable 162, each having a suitable groove to receive the cable. The top surface of the upper block and the bottom surface of the lower block have grooves 192 which receive the rounded ends of the arms 180 and 183. The length of the arms 180 and 183 are such that when the blocks 190 are urged to the left as viewed in FIG. 11, the arms wedge or bind the blocks against the cable preventing relative movement of the cable and the blocks.

As seen in FIGS. 11, 13 and 14, an L-shaped member 196 has a portion 197 which engages the rearward end of the blocks 190, the portion 197 having a U-shaped opening 198 so as not to interfere with the cable 162. Another portion 200 of the L-shaped member extends along the wall of one of the plates 164. The forward end of the member 196 has a slot 202 through which a pin 204 extends, the pin 204 being attached to the plate 164. Another pin 206 is secured to the member 196 rearwardly of the pin 204, and a spring 208 is connected between the pins to urge the member 196 in the forward direction and thereby urge the blocks 190 in the forward direction.

In operation of the gripper 160, as the arm 150 is raised at its rearward end causing counterclockwise movement of the arm as viewed in FIG. 11 about the pivot 154, the gripper 160 is urged to the right but because of the wedging action of the arms 180 and 183 and the blocks 190 against the cable 162, such movement is prevented and instead the pivot 152 is caused to move in the forward direction. This in turn causes the entire drive unit to move in the forward direction. As the arm 150 is lowered, the arms 180 and 183 of the gripper pivot to the right (the upper arm pivoting slightly counterclockwise and the lower arm pivoting slightly clockwise) to allow the gripper to slide to the left on the cable 162 as viewed in FIG. 11.

With particular reference to FIG. 2, another gripper 214, identical to the gripper 160 is mounted to the rearward end of the frame 30 by a suitable bracket 216. The gripper 214 acts as a holding gripper to prevent reverse movement of the drive unit during lowering of the arm 150 due to any drag between the gripper 160 and the cable.

With particular reference to FIG. 8, the rearward end of the arm 150 is generally the same in structure as the rearward end of the arm 60, the rearward end of the arm 150 terminating in parallel plates 220 which are similar to the plates 66. Also, the rearward end of the arm 150 is caused to move up and down while pivoting about the axes 152 and 154 by means of a liquid or water drive assembly 222 which is identical in structure and function to the water drive assembly 62 heretofore described. Thus, operation of the water drive unit 222 to pivotally reciprocate the arm 150 moves the drive unit 22 along the cable 162 by operation of the grippers 160 and 214.

The drive unit 22 of this invention includes a control assembly for automatically controlling the reciprocating speed of the arm 150 relative to the arm 60, and thus the relative speed of the drive unit 22 and the conduit 24 to maintain proper alignment between the drive unit and conduit. This control system will now be described.

With reference to FIGS. 3, 4, 6, 8, 9, and 10, a flexible hose 230 is connected between the inlet port 90 of the water drive assembly 62 and one side of a valve 232 having an actuator 233 for manual operation. The other side of the valve 232 is connected by suitable conduit and fittings 234 to the conduit section 44. Another hose 236 is connected between the conduit section 44 and a valve 238 mounted to the underside of a horizontally oriented, generally U-shaped channel member 240 supported by a suitable bracket 242 at its rearward end to the tubular frame 30. A vertically oriented U-shaped channel member 244 is secured at the rearward end of the channel member 240. The valve 238 has a spring biased actuator 246 extending through the bottom of the channel member 240. The valve 238 is operated by depressing the actuator 246, and with the actuator biased in its extended position, the valve is closed. The other side of the valve 238 is connected by a hose 250 to the inlet port of the water drive assembly 222 so that by controlling the valve 238 the rate of reciprocation of the arm 150, and thus the speed of the drive unit is controlled.

A member 252 having lobes 253, 254 and 255 is pivotally mounted at 256 within the channel member 240. Rollers are mounted at the lobes 253 and 255. A pin 258 depends downwardly from the member 252 directly above the actuator 246 of the valve. A rod 260 extends through the vertical channel 244 beneath the roller at 253 and above the roller at 255, the rod 260 having a bend forming a cam surface at 262. The rod 260 is offset laterally at 264 and extends forwardly through a guide 266 supported to the frame 30 by a suitable bracket 268, allowing fore and aft sliding movement of the rod 260. The forward end of the rod has another cam surface 270 (FIG. 8), for purposes to be described.

A bracket 274 is secured to the rearward end of the rod 260 for movement therewith, and a coil spring 276 surrounds the rod between the bracket 274 and the vertical channel 244 for biasing the rod 260 to the left as viewed in FIGS. 8 and 9.

Brackets 278 (FIGS. 1, 3 and 4) are located along the conduit 24 a substantial distance to each side of the drive unit 22, and are held fixed along the length of the conduit by any suitable means such as pipe flanges or the like (not shown). This distance may for example be approximately 10–15 feet. The bracket 278 should be located a sufficient distance to detect fore and aft displacement of the conduit 24 relative to the drive unit 22. Some outward limitation is imposed on the placement of the bracket due to the practical limits of mounting the brackets. The brackets 278 generally comprise rings surrounding the conduit with rollers 280 secured to the rings and surrounding the conduit such that the conduit 24 is rotatable on the rollers. Drag rods 281 (FIGS. 1, 2 and 3) are connected to the brackets 278 to prevent their rotation. These rods are weighted at 281' to hold them against the ground. Rigid rods 282 are connected between the brackets 278 and the bracket 274 at the rearward end of the rod 260. Thus, the rods 282 extend from the conduit 24 from each side of the drive unit rearwardly toward the drive unit and connect to the rearward end of the rod 260.

It is seen that fore and aft displacement of the conduit 24 relative to the drive unit 22 produces longitudinal movement of the rod 260 through the rods 282. This movement of the rod 260 in turn controls the operation of the valve 238 which regulates the speed of the drive unit. In this way the speed of the drive unit is controlled in response to relative displacement of the conduit and drive unit.

The control system of this invention also has a means for shutting down both drives for the conduit and drive unit in the event that the relative fore and aft displacement becomes excessive. This comprises a butterfly valve 290 located in the conduit section 44 between the tubular frame 30 and the connections for the hoses 230 and 236. The valve 290 is operated by a crank arm 292 having its forward end connected by a spring 294 to a support pipe 295 to bias the valve in the closed position. The rearward end of the crank arm 292 can be made to rest on a pin 298 which extends through a cylindrical housing 300 mounted at the top of the bracket 268 (FIGS. 8, 9, 11 and 12). A spring 302 surrounds the pin 298 within the housing 300 to bias the pin toward the rod 260 and its cam surface 270 and away from the crank arm 292. As long as the pin 298 engages the cam surface 270 of the rod 260, the pin is made to extend sufficiently far from the other side of the housing 300 to support the crank arm 292 and hold the butterfly valve 290 in the open position. However, if the fore and aft relative displacement of the conduit 24 and drive unit 22 become sufficiently excessive to move the cam surface 270 off the pin 298, the pin is allowed to move axially from beneath the crank arm 292 causing the crank arm to fall under the force of the spring 294 and thereby close the valve 290 to shut off the supply of liquid to both of the drive units 62 and 222. A shock absorber or damper 306 is mounted between the vertical support pipe 295 and the crank arm 292 to dampen its downward movement under the force of the spring.

Also connected at each side of the vertical support 295 are hydraulic cylinders 310 having their pistons connected to the tops of the arms 60 and 150. The cylinders 310 receive liquid through hoses 312, 313 and 314 from the tubular frame 30 so that positive liquid pressure is always applied to these cylinders. The cylinders thus act to bias the arms 60 and 150 downward. In this way the water drive assemblies 62 and 222 do not depend solely on gravity for lowering the arms 60 and 150 between power strokes.

OPERATION

In operation of the irrigation system 20 of this invention it will first be assumed that the drive unit 22 is to travel to the left as viewed in FIG. 2 and that the rod 260 is positioned with its cam surface 270 against the pin 298 with the crank arm 292 resting on top of the pin so that the valve 290 is open. It will also be assumed that water, or other liquid, is being fed through the hose and tubular frame 30, the conduit section 44, and the conduit 24 as heretofore described to distribute the liquid over the field to be irrigated. Additionally, it will be assumed that the valve 232 is open to set the speed of the sprockets 52 and thus the conduit 24 for a desired amount of irrigation, and that the valve 238 is open to some degree between its fully opened and fully closed positions.

With these initial conditions, water from the tubular frame 30 is fed through the butterfly valve 290, the conduit 234 and the hose 236 to the inlets of the valves 232 and 238. Depending on the degree to which the valves 232 and 238 are open, a specified amount of liquid is fed from the outlet of the valve 232, through the hose 230, and to the water drive assembly 62 to rotatably drive the sprockets 52 and hence the conduit 24 as heretofore described. The rotational speed of the conduit remains substantially constant during normal operation. Liquid from the outlet of the valve 238 is fed to the water drive assembly 222 which operates the grippers 160 and 214 in the manner heretofore described to move the drive unit along the cable 162.

As long as the drive unit remains in alignment with the conduit, the reciprocating drive speeds of the arms 60 and 150 remain constant, although perhaps not equal. However, if the drive unit becomes displaced forwardly relative to the conduit for any reason, such as uneven terrain or excessive speed of the drive unit 22, the rod 260 will be caused to move rearwardly through operation of the rods 282 connected between the rear end of the rod 260 and the conduit 24. This will cause the cam surface 262 of the rod 260 to move off the roller at 255, thereby allowing the member 252 to rotate counterclockwise as viewed in FIG. 9 about its pivot point 256. This allows the pin 258 to move upwardly away from the actuator 246 of the valve 238 to allow movement of the valve 238 in the closed direction to reduce the amount of liquid fed to the water drive assembly 222, and thereby reduce the speed of the drive unit 22. As the drive unit 22 slows in speed relative to the drive of the conduit 24, the drive unit will move again into alignment with the conduit.

If the drive unit 22 becomes displaced rearwardly relative to the conduit 24, the rod 260 is caused to move forwardly (to the right as viewed in FIG. 9), causing the cam surface 262 to pivot the member 252 clockwise, and causing the pin 258 to further depress the actuator 246. This causes the valve 238 to be moved in the open direction to thereby increase the speed of the drive unit 22 so that it will catch up to the conduit 24. In this manner, the speed of the drive unit is automatically controlled to maintain proper alignment of the conduit 24 within specified limits.

If either the fore or aft relative displacement of the drive unit and conduit becomes excessive, the cam surface 270 of the rod 260 is made to move off the pin 298 allowing the crank arm 292 to drop to close the butterfly valve 290 as heretofore described, and thereby shut down the drives to both the drive unit and conduit.

Various changes and modifications may be made in this invention, as will be readily apparent to those skilled in the art. Such changes and modifications are within the scope and teaching of this invention as defined by the claims appended hereto.

What is claimed is:

1. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising a frame, wheels rotatably mounted on said frame for supporting said frame above the ground and for movement along a path, means rotatably mounting said conduit to said drive unit frame for rotation about a generally horizontal axis generally normal to the path of the drive unit, a sprocket concentrically secured to said conduit for rotation therewith, a first radial arm secured at one end for rotation about said axis of said conduit, a first liquid drive means mounted between said frame and the other end of said first arm to impart an oscillating pivotal movement to said first arm, pawl means pivotally mounted to said first arm and frame and selectively engaging the teeth of said sprocket for imparting rotation to said sprocket in response to pivotal movement of said first arm in one direction and for preventing reverse rotation of said sprocket upon pivotal movement of said first arm in the opposite direction, the frequency of said oscillations of said first arm being proportional to the amount of liquid supplied to said first liquid drive means, a second radial arm pivotally mounted to said frame about a first axis parallel to that of the conduit, a cable gripper pivotally mounted to said second arm about a second axis parallel to said first axis, said first and second axes of said second arm being positioned such that oscillating pivotal movement of said second arm about one of said first or second axes produces fore or aft movement of said other of said first or second axes when said one of said axes is held against such fore or aft movement, means associated with said cable gripper for gripping a fixed cable and for holding said second axis substantially immovable in the forward direction as said arm is pivoted in one direction about said second axis, a second liquid drive means mounted between said frame and said second arm to impart an oscillating pivotal movement to said second arm, the frequency of said oscillations of said second arm being proportional to the amount of liquid supplied to said second liquid drive means, and means for controlling the rate of pivotal oscillation of said second arm relative to said first arm, and hence the rate of movement of said drive unit relative to said conduit, said controlling means comprising a linkage attached to said conduit a distance from said drive unit, a first section of said linkage extending from said conduit at one side of said drive unit at an angle towards said drive unit and a second section of said linkage extending from said conduit at the other side of said drive unit at an angle towards said drive unit, a first liquid input means to said first liquid drive means, a second liquid input means to said second liquid drive means, a first valve means in said first liquid input means for controlling the amount of liquid fed to said first liquid drive means, a second valve means in said second liquid input means for controlling the amount of liquid fed to said second liquid drive means, said first and second valve means having valve actuating means associated therewith, means engaging said linkage means with said actuating means of said second valve means to move said second valve means in the open direction an amount proportional to linkage movement as said linkage moves in response to movement of said drive unit to a position behind said conduit and to move said second valve means in the closed direction an amount proportional to linkage movement as said linkage moves in response to movement of said drive unit to a position ahead of said conduit.

2. In the irrigation system of claim 1 wherein said drive unit further comprises a third valve means in both liquid input means and having actuating means for opening and closing said third valve means, and means connected to said actuator means of said third valve means for closing said third valve means at predetermined excessive fore and aft relative displacements of said drive unit and conduit.

3. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising means allowing movement of said drive unit along a path, means rotatably mounting said conduit to said drive unit for rotation about a generally horizontal axis generally normal to the path of the drive unit, means for rotating said conduit, means for driving said drive unit along the path, and control means for controlling the relative speed of the drive means for said drive unit and said conduit in response to fore and aft relative displacement of said drive unit and said conduit; said means for rotating said conduit further comprising a rotatably mounted sprocket, a radial arm rotatably mounted about an axis parallel to that of the sprocket, means reciprocating said arm for pivotal movement about its axis, and means imparting rotation to said sprocket in one direction in response to reciprocating movement of said arm; said means for driving said drive unit further comprising a second radial arm pivotally mounted about a first axis parallel to that of the conduit, said first axis moving with said drive unit, a cable gripper pivotally mounted to said second arm about a second axis parallel to said first axis, said first and second axes being positioned such that pivotal movement of said second arm about one of said first or second axes produces fore or aft movement of said other of said first or second axes when said one of said axes is held against such fore or aft movement, and means associated with said cable gripper for holding said second axis substantially immovable in the fore and aft direction as said arm is pivoted in one direction about said first and second axes, and means reciprocating said second arm for pivotal movement about said first and second axes.

4. In the irrigation system of claim 3, said control means further comprising means for varying the speed of reciprocation of said second arm in said drive means for said drive unit in response to fore and aft relative displacement of said drive unit and said conduit.

5. In an irrigation system for irrigating an area of a field which irrigation system includes a liquid conduit supported by wheels extending over a portion of said area to be irrigated, a drive unit for supplying liquid to said conduit and for rotating said conduit and wheels, said drive unit comprising means allowing movement of said drive unit along a path, means rotatably mounting said conduit to said drive unit for rotation about a generally horizontal axis generally normal to the path of the drive unit, means for rotating said conduit, a reciprocating cable gripping means for engagement with a fixed cable extending along said path, means for reciprocating said cable gripping means to move said drive unit along said cable, and control means for controlling the relative speed of reciprocation of said cable gripping means and the conduit drive means in response to relative fore and aft displacement of said drive unit and said conduit.

* * * * *